(12) United States Patent
Gerö et al.

(10) Patent No.: US 10,298,499 B2
(45) Date of Patent: May 21, 2019

(54) TECHNIQUE OF OPERATING A NETWORK NODE FOR LOAD BALANCING

(71) Applicant: Telefonaktiebolaget L M Ericsson (publ), Stockholm (SE)

(72) Inventors: Balázs Peter Gerö, Budapest (HU); Bhaskara Chinni, Fremont, CA (US); András Császár, Telki (HU); Sriganesh Kini, Fremont, CA (US); Andrew Wilkinson, San Francisco, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/785,940

(22) PCT Filed: Apr. 30, 2013

(86) PCT No.: PCT/EP2013/058995
§ 371 (c)(1),
(2) Date: Oct. 21, 2015

(87) PCT Pub. No.: WO2014/177190
PCT Pub. Date: Nov. 6, 2014

(65) Prior Publication Data
US 2016/0099873 A1 Apr. 7, 2016

(51) Int. Cl.
*H04L 12/803* (2013.01)
*H04L 12/707* (2013.01)
(Continued)

(52) U.S. Cl.
CPC ............ *H04L 47/125* (2013.01); *H04L 45/22* (2013.01); *H04L 45/24* (2013.01); *H04L 45/50* (2013.01); *H04L 45/18* (2013.01)

(58) Field of Classification Search
CPC .................................................. H04L 47/125
See application file for complete search history.

(56) References Cited

U.S. PATENT DOCUMENTS

2005/0007954 A1* 1/2005 Sreemanthula ......... H04L 47/10
370/229
2006/0193248 A1* 8/2006 Filsfils .................... H04L 45/04
370/216
(Continued)

FOREIGN PATENT DOCUMENTS

| CN | 101120552 A | 2/2008 |
|---|---|---|
| CN | 102025632 A | 4/2011 |
| CN | 102437955 A | 5/2012 |

OTHER PUBLICATIONS

Andersson, L. et al., "LDP Specification", IEFT, Network Working Group, Request for Comments: 5036, Obsoletes: 3036, Category: Standards Track, Oct. 2007, pp. 1-135.
(Continued)

*Primary Examiner* — John D Blanton
(74) *Attorney, Agent, or Firm* — Murphy, Bilak & Homiller, PLLC

(57) ABSTRACT

According to one aspect of the present disclosure, a method of operating a network node of a communication network is provided, the network node being connected to a downstream network node, and to a non-downstream loop free alternate (LFA) network node comprising a load balancing identifier indicating whether it is allowed to load balance the data packet via a non-downstream LFA network node or not; changing, if the load balancing identifier indicates that it is allowed to load balance the data packet via a non-downstream LFA network node, and if the network node decides to load balance the data packet via the non-downstream LFA network node, the load balancing identifier of the data packet such that it indicates that a further load balancing of
(Continued)

the data packet via a further non-downstream LFA network node is not allowed; and forwarding the thus modified data packet to the non-downstream LFA network node.

10 Claims, 7 Drawing Sheets

(51) Int. Cl.
*H04L 12/723* (2013.01)
*H04L 12/705* (2013.01)

(56) References Cited

U.S. PATENT DOCUMENTS

| 2007/0091796 | A1* | 4/2007 | Filsfils | H04L 45/00 370/228 |
|---|---|---|---|---|
| 2009/0310610 | A1* | 12/2009 | Sandstrom | H04L 45/00 370/392 |
| 2011/0286326 | A1* | 11/2011 | Awano | H04L 45/42 370/225 |
| 2013/0223237 | A1* | 8/2013 | Hui | H04L 45/34 370/250 |
| 2014/0160925 | A1* | 6/2014 | Xu | H04L 47/17 370/235 |

OTHER PUBLICATIONS

Atlas, A. et al., "Basic Specification for IP Fast Reroute: Loop-Free Alternates", IEFT, Network Working Group, Request for Comments: 5286, Category: Standards Track, Sep. 2008, pp. 1-31.
Filsfils, C. et al., "Loop-Free Alternate (LFA) Applicability in Service Provider (SP) Networks", Internet Engineering Task Force (IEFT), Request for Comments: 6571, Category: Informational, ISSN: 2070-1721, Jun. 2012, pp. 1-35.
Litkowski, S. et al., "Operational Management of Loop Free Alternates", IEFT, Routing Area Working Group, Internet-Draft, Intended status: Standards Track, draft-litkowski-rtgwg-lfa-manageability-01, Feb. 18, 2013, pp. 1-18.
Moy, J. et al., "OSPF Version 2", Internet Engineering Task Force, Network Working Group, Request for Comments: 2328, STD: 54, Obsoletes: 2178, Category: Standards Track, Apr. 1998, pp. 1-244.
Rosen, E. et al., "Multiprotocol Label Switching Architecture", IETF, Network Working Group, Request for Comments: 3031, Category: Standards Track, Jan. 2001, pp. 1-61.
Zhang, M. et al., "Load-Balanced IP Fast Failure Recovery", Proceedings of the 8th IEEE International Workshop on IP Operations and Management (IPOM '08), Springer-Verlag Berlin, Heidelberg, Sep. 22, 2008, pp. 53-65.
Zhao, Q. et al., "LDP Extensions for Multi Topology Routing", Internet Engineering Task Force, Internet-Draft, Intended status: Standards Track, Updates: RFC4379, Expires: Jun. 7, 2013, draft-ietf-mpls-ldp-multi-topoloogy-06.txt, Dec. 4, 2012, pp. 1-20.

* cited by examiner

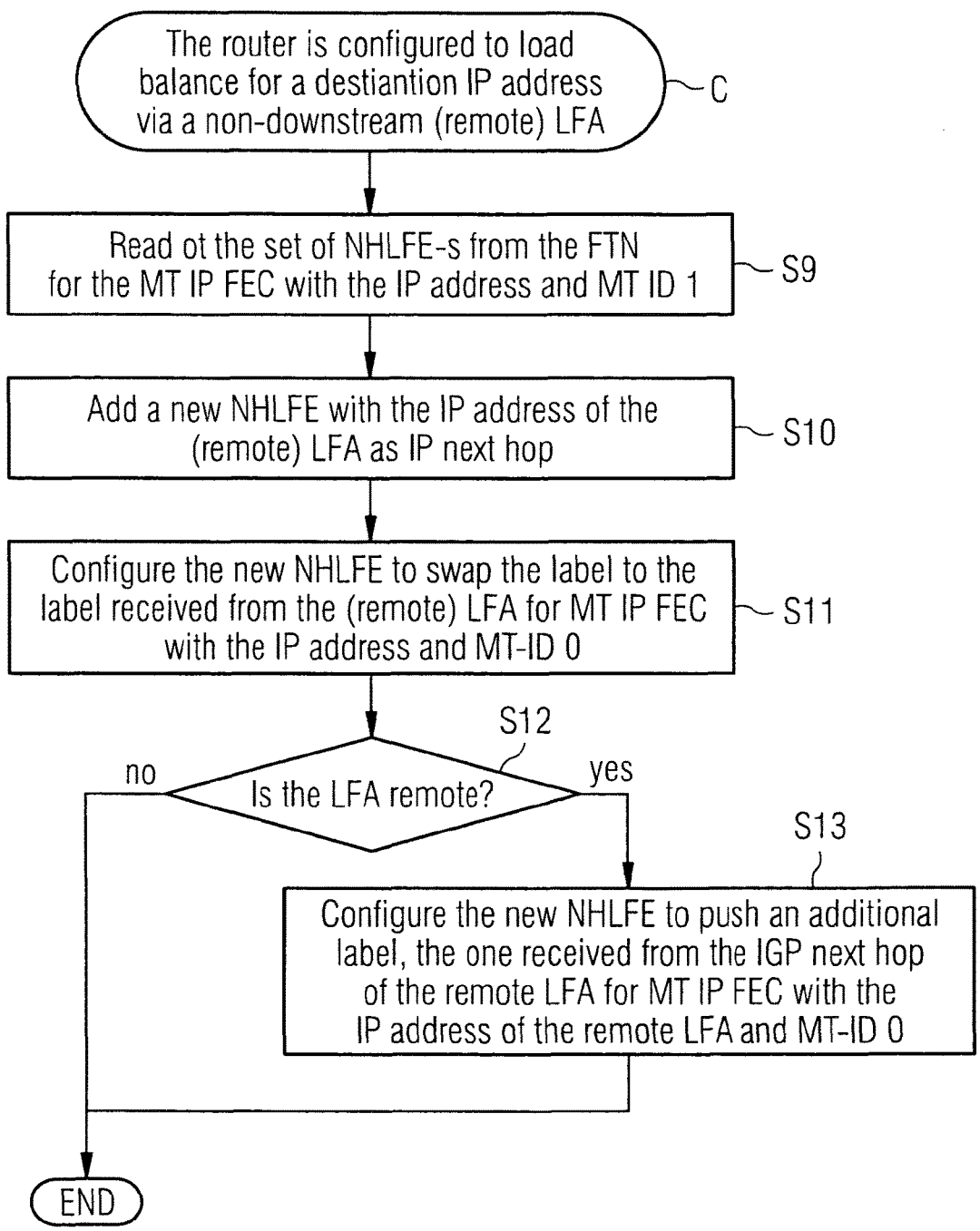

TECHNIQUE OF OPERATING A NETWORK NODE FOR LOAD BALANCING

TECHNICAL FIELD

The present disclosure relates to a technique of operating a network node of a communication network in connection with load balancing. The technique may be implemented in the form of a method, a computer program product or a network node.

BACKGROUND

In a multi protocol label switching (MPLS) communication network, a data packet travels from one router to the next, wherein each router makes an independent forwarding decision for the data packet. That is, each router analyzes a header of the data packet, and each router runs a network layer routing algorithm. Each router independently chooses a next hop (next router) for the data packet, based on its analysis of the data packet header and the routing algorithm.

In order to choose the next hop, the router may determine to which forwarding equivalence class (FEC) the data packet belongs. Then, the router maps the FEC to a next hop. Different data packets which get mapped into the same FEC are indistinguishable, as far as the forwarding decision is concerned. That is, all data packets which belong to a particular FEC and which are sent out from a common network node will follow the same path through the communication network (or if certain kinds of multi-path routing are in use, they will all follow one of a set of paths associated with the FEC).

In conventional Internet Protocol (IP) forwarding, as the data packet traverses the network, each router reexamines routing data of the data packet (typically included in the header of the data packet) and assigns it to an FEC. In contrast, in MPLS communication networks, the assignment of a particular data packet to a particular FEC is done just once, usually when the packet enters the MPLS communication network. The FEC to which the data packet is assigned is encoded as a short fixed length value known as "label" and included into the header of the data packet. Thus, when a data packet is forwarded to its next hop, the label is sent along with it; that is, the data packets are "labeled" before they are forwarded. At subsequent routers, there is no further analysis of the header of the data packet. Rather, the label is used as an index which specifies the next hop, and a new label. The old label is replaced with the new label, and the packet is forwarded to its next hop. That is, in MPLS forwarding, once a data packet is assigned to a FEC, no further header analysis is done by subsequent routers (i.e., all forwarding is driven by the label, wherein the label itself represents the FEC).

MPLS communication networks have a number of advantages, compared to conventional networks: First, MPLS forwarding can be done by low performance routers ("switches") which are capable of doing label lookup and replacement, but which need not be capable of analyzing the headers of the data packets, or need at least not be capable of analyzing the headers at adequate speed.

Second, since a data packet is assigned to a FEC at the router where it enters the network (ingress router), the ingress router may use, in determining the assignment, any information related to the data packet, even if that information cannot be derived from the header of the data packet, which is a further advantage. For example, data packets arriving on different ports of the ingress router may be assigned to different FECs. Conventional forwarding, on the other hand, can only consider information included in the header of the data packet.

Third, a data packet which enters the communication network at a particular router can be labeled differently than the same packet entering the network at a different router, and as a result forwarding decisions that depend on the ingress router can be easily made. Also, processes that determine how a data packet is assigned to a FEC can be complex since they have to be carried out only once, at the ingress router. The other routers that merely forward labeled data packets do not have to carry out these processes.

If the amount of data packets to be routed through the communication network from a first router to a second router exceeds a particular threshold value, it may be advantageous to route the data packets from the first router to the second router via a plurality of paths instead of via a single path in order to adequately balance the load of data packets ("load balancing"). However, IP/MPLS networks do not support per se load balancing of data packets applicable in all kinds of communication network topologies. In particular, IP/MPLS communication networks do not support load balancing of data packets in aggregation/backhaul network topologies including ring topologies.

SUMMARY

It is desirable to provide a load balancing mechanism that is applicable in any network topology, in particular in any topology of IP/MPLS communication networks.

According to an aspect of the present disclosure, a method of operating a network node of a communication network is provided, the network node being connected to a downstream network node, and to a non-downstream loop free alternate (LFA) network node. The method comprises receiving a data packet at the network node comprising a load balancing identifier indicating whether it is allowed to load balance the data packet via a non-downstream LFA network node or not; changing, if the load balancing identifier indicates that it is allowed to load balance the data packet via a non-downstream LFA network node, and if the network node decides to load balance the data packet via the non-downstream LFA network node, the load balancing identifier of the data packet such that it indicates that a further load balancing of the data packet via a further non-downstream LFA network node is not allowed; and forwarding the thus modified data packet to the non-downstream LFA network node. The downstream network node may be a LFA or a "normal" network node.

In one realization of this aspect, the number of routing hops via non-downstream LFA network nodes (which may be remote LFAs) may be limited. This is sometimes desirable since data packets do not get closer to the destination network node (in certain metrics) during the routing hop over the non-downstream LFA network node. Thus, using a plurality of non-downstream LFA network nodes could cause permanent loops of the data packets within the communication network which is to be avoided. Thus, this approach also works on communication networks having ring topologies in which the number of ingress/egress node pairs with multiple equal cost paths connected in-between is low, and in which the downstream LFAs are not available either.

In the context of examples of the present disclosure, "LFA network node" with regard to a particular network node may in one variant mean a network node which is not a direct neighboring network node of the particular network node.

The shortest path from the LFA network node to a destination network node may not go back through the particular network node. In this way, the data packet may not be allowed to be sent back from the LFA network node to the particular network node (since the LFA network node usually aims at sending the data packet via the shortest path to the destination network node).

If the load balancing identifier indicates that it is not allowed to load balance the data packet via a non-downstream LFA network node, the network node may forward the data packet to a downstream network node (e.g., to a downstream LFA network node or to a next hop of a shortest path connection to the destination network node). However, according to one implementation, even if the load balancing identifier indicates that it is not allowed to load balance the data packet via a non-downstream LFA network node, the network node may nevertheless forward the data packet to the non-downstream LFA network node (or to a different non-downstream LFA network node) in case that a failure has occurred in the communication network which would negatively affect or prohibit the forwarding of the data packet to the downstream network node. Alternatively, the data packet may also be dropped if the load balancing identifier indicates that it is not allowed to load balance the data packet via a non-downstream LFA network node, and if a failure has occurred in the communication network which would negatively affect or prohibit the forwarding of the data packet to the downstream network node.

The communication network may be a MPLS communication network, and the network node may be a label switching router (LSR). However, the present disclosure is not restricted thereto. Variants of the present disclosure may for example be also applicable to "pure" IP communication networks (which do not have MPLS functionality). In this case, the standard IP functionality can be extended by additional functionality.

The data packet may comprise a label including the load balancing identifier and a data packet destination IP address. The network node may treat the data packet as belonging to a first forwarding equivalence class (FEC) if the load balancing identifier indicates that it is allowed to load balance the data packet via a non-downstream LFA network node, and the network node may treat the data packet as belonging to a second FEC if the load balancing identifier indicates that it is not allowed to load balance the data packet via a non-downstream LFA network node. In this way, load balancing, i.e., changing the load balancing identifier and forwarding the data packet can be carried out using standard functionality for handling data packets belonging to different FECs.

Before receiving the data packet at the network node, the network node may allocate for at least one IP destination address corresponding to a reachable destination network node, a first label and a second label, wherein the first label comprises the IP destination address and a load balancing identifier indicating that it is allowed to load balance the data packet via a non-downstream LFA network node, and wherein the second label comprises the IP destination address and a load balancing identifier indicating that it is not allowed to load balance the data packet via a non-downstream LFA network node. Then, the network node may communicate the first label and the second label to neighboring network nodes ("label distribution protocol (LDP) messages").

The destination IP address and the load balancing identifier may together form a multi topology internet protocol (MT IP) address.

The routing information stored in the network node according to which the network node forwards the data packet may be the same for both the first FEC and the second FEC, but it does not necessarily have to be the same.

Before receiving the data packet at the network node, the network node may carry out the following processes: determining a set of next hop label forwarding entries (NHLFEs) which are assigned to the destination IP address and a load balancing identifier indicating that the data packet belongs to the first FEC, based on routing information stored in the network node; and adding a new NHLFE to the set of NHLFEs, the new NHLFE comprising the IP address of the non-downstream LFA network node as next hop, wherein the new NHLFE comprises instructions to swap a label of the data packet such that the load balancing identifier indicates that the data packet belongs to the second FEC. In case that a plurality of non-downstream LFA network nodes are available for the network node for load balancing, a plurality of new NHLFEs may be added to the set of NHLFEs, each new NHLFE comprising the IP address of one of the non-downstream LFA network nodes as next hop, wherein the new NHLFE comprises instructions to swap a label of the data packet such that the load balancing identifier indicates that the data packet belongs to the second FEC.

If the non-downstream LFA network node is not a direct neighbor of the network node (remote non-downstream LFA network node), an additional label ("outer label") which has been received at the network node from a neighboring network which is located between the network node and the non-downstream LFA network node can be attached ("pushed") to the data packet, wherein the additional label comprises a data packet destination IP address corresponding to that of the non-downstream LFA network node, and a load balancing identifier indicating that it is not allowed to load balance the data packet via a non-downstream LFA network node (the outer label may be bound to the MT-IP address of the (remote) LFA node, so in this way the IP address of the remote LFA node is coded in the label, but the IP address itself is not located in the data packet).

Generally, as a first option (IP/MPLS option), the IP address may not be located in the header of the data packet, but the label identifies the destination network node. As a second option, the IP address may be explicitly located in the header of the data packet (pure IP option).

The data packet may be forwarded to the neighboring network node. The pushing of the additional label has in certain variants the effect that it is prevented that the data packet is sent back to the network node, and it is prevented that the data packet is sent to a network node which is not the non-downstream LFA network node ("tunneling" of the data packet through the neighboring network node). By tunnelling, it can be ensured that the intermediate network nodes between the particular node and the remote LFA do not route the data packets back to the particular network node. On the other hand, by selecting a network node as remote LFA network node that has per se all the attributes required to be a LFA network node by definition, it can be ensured that the LFA network node itself will not route the data packet back to the particular node.

According to a further aspect of the present disclosure, a method of operating a network node of a MPLS communication network is provided. The method comprises generating, if load balancing of data packets between the network node and a destination network node via a non-downstream LFA network node is to be enabled, a first MT IP address comprising a destination IP address of the destination network node, and a load balancing identifier which represents a first FEC of the data packets, and generating a second MT IP comprising a destination IP address of the destination network node, and a load balancing identifier which represents a second FEC of the data packets. The method further comprises triggering the generation of LDP messages having the first MT IP address as an input parameter, and triggering the generation of LDP messages having the second MT IP address as an input parameter such that neighboring network nodes receive the LDP messages.

The LDP messages may be generated by the network node such that routing information based on which the further network node routes data packets to the destination network node is the same for both the first FEC and the second FEC.

According to a still further aspect, a computer program product is provided comprising program code portions for performing the steps of any one of the embodiments of the present invention when the computer program product is executed on one or more computing devices. The computer program product of claim may be stored on a computer-readable recording medium.

According to another aspect, a network node of a communication network is provided, the network node being connectable to a LFA network node, and to a non-downstream LFA network node of the communication network. The network node comprises a receiving unit configured to receive a data packet comprising a load balancing identifier indicating whether it is allowed to load balance the data packet via a non-downstream LFA network node or not. The network node further comprises a processing unit connected to the receiving unit and configured to change, if the load balancing identifier indicates that it is allowed to load balance the data packet via a non-downstream LFA network node, and if the network node decides to load balance the data packet via the non-downstream LFA network node, the load balancing identifier of the data packet such that it indicates that a further load balancing of the data packet via a further non-downstream LFA network node is not allowed. Further, the network node comprises a forwarding unit connected to the processing unit configured to forward the thus modified data packet to the non-downstream LFA network node.

According to a further aspect, a network node of a MPLS communication network is provided which comprises a generation unit configured to generate, if load balancing of data packets between the network node and a destination network node via a non-downstream LFA network node is to be enabled, a first MT IP address comprising a destination IP address of the destination network node, and a load balancing identifier which represents a first FEC of the data packets, and to generate a second MT IP comprising a destination IP address of the destination network node, and a load balancing identifier which represents a second FEC of the data packets. The network node further comprises a triggering unit connected to the generation unit and configured to trigger the generation of LDP messages having the first MT IP address as an input parameter, and to trigger the generation of LDP messages having the second MT IP address as an input parameter such that neighboring network nodes receive the LDP messages.

The above described aspects may enable a network node to load balance between a shortest path to a destination network node and one or several non-downstream LFA network nodes which may be remote LFA network nodes. In order to do so, two new FEC types for network internal IP addresses may be introduced. One of the FECs allows load balancing via a non-downstream (possibly remote) LFA network node, and the other FEC prohibits load balancing via a non-downstream (possibly remote) LFA network node.

When ingress routers push a label to a data packet (i.e., when for the first time a label is attached to the data packet), the label may correspond to the FEC that allows load balancing via a non-downstream (remote) LFA network node. If succeeding routers or the ingress routers themself decide to load balance the data packet via a non-downstream (remote) LFA network node, they swap the label of the data packet such that the outgoing label corresponds to the FEC that prohibits further load balancing via a non-downstream (remote) LFA network node.

BRIEF DESCRIPTION OF THE DRAWINGS

In the following, the present disclosure will be described in more detail with reference to exemplary embodiments illustrated in the drawings, wherein

FIG. 7 shows a schematic flowchart of a method of operating a network node according to an embodiment;

DETAILED DESCRIPTION

Figure 1:
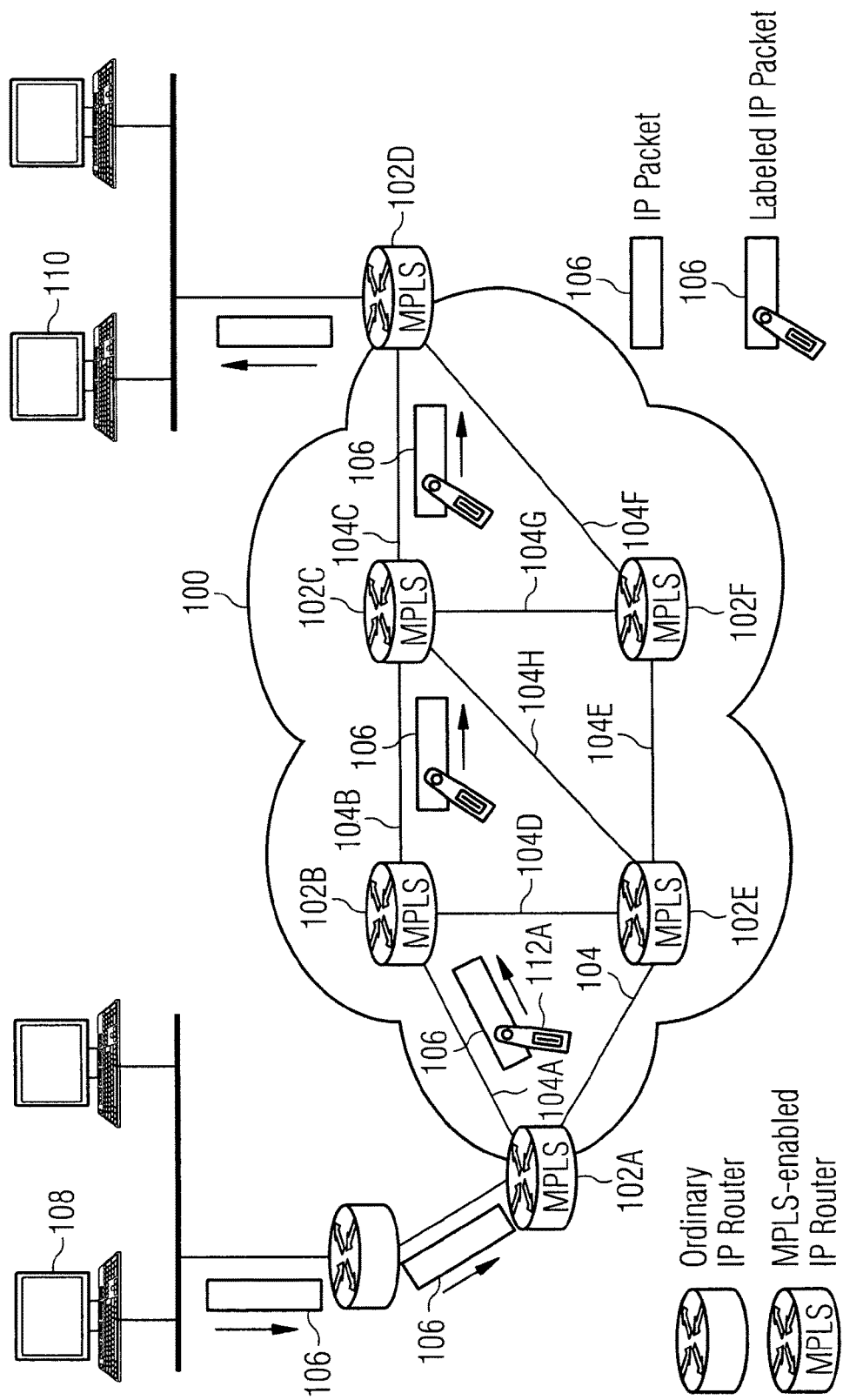
FIG. 1 shows a schematic drawing of an exemplary MPLS communication network.

In the following description, for purposes of explanation and not limitation, specific details are set forth, such as specific device and system configurations and specific methods, steps and functions, in order to provide a thorough understanding of the technique presented herein. It will be appreciated that this technique may be practiced in other embodiments that depart from these specific details.

Those skilled in the art will further appreciate that the methods, steps and functions described herein may be implemented using individual hardware circuitry, using software functioning in conjunction with a program microprocessor or general purpose computer, using one or more Application Specific Integrated Circuits (ASICs), one or more Digital Signal Processors (DSPs) and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

With respect to the following embodiments, the same reference numerals are used to denote the same or similar components.

Figure 9:
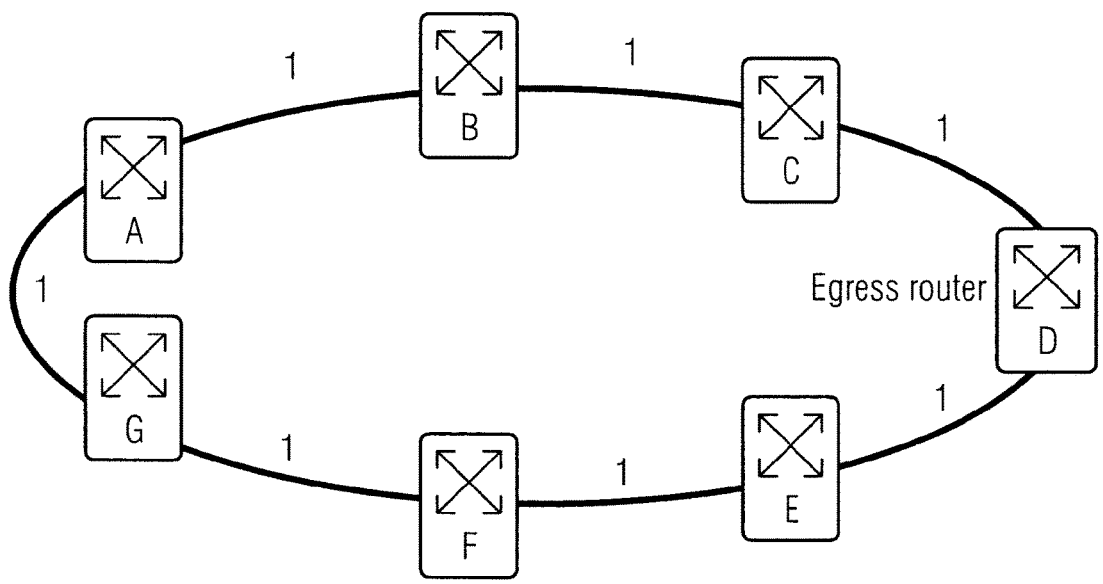
FIG. 9 shows a schematic drawing of an exemplary MPLS communication network having a ring topology.

First, making reference to FIG. 9, the meaning of the terms LFA communication node and remote LFA communication node will be explained by way of a non-limiting example. FIG. 9 shows a communication network having a ring topology. A shortest path next hop of network node (router) F to network node D is via network node E. A shortest path next hop of network node G to network node D is via network node F. Network node G is not a LFA for network node D to network node D since, assuming that network node F would send the data packet via network node G to network node D, there would be a loop. This means that network node F does not have a direct LFA to network node D. But the shortest path of network node A to network node D is not via network node F, so network node A is a remote LFA for network node F to network node D.

In order to better understand the embodiments, the architecture of a conventional MPLS/IP communication network 100 will be explained first with respect to FIG. 1. The MPLS/IP communication network 100 comprises a plurality of network nodes (in the following referred to as routers) 102 which are connected with each other via communication links 104. In FIG. 1, the situation is shown where a data packet 106 is sent from a first communication device 108 connected to the MPLS/IP communication network 100 to a second communication device 110 connected to the MPLS/IP communication network 100 via a communication path which runs through the MPLS/IP communication network 100 and which includes the routers 102A, 102B, 102C, and 102D. The data packet 106 travels from router 102A to router 102D. Each router 102 analyzes the header of the data packet 106 and chooses a next hop (next router) for the data packet 106, based on its analysis of the header of the data packet 106 and a routing algorithm stored in each router 102. Here, it is assumed that based on the decision of the routers 102, the data packet travels along routers 102A, 102B, 102C, and 102D, in this order.

In order to choose the next hop, the router 102 determines to which FEC the data packet 106 belongs. Then, the router 102 maps the FEC (and thus the data packet 106) to a next hop. The assignment of the data packet 102 to the corresponding FEC is done just once (at router 102A (ingress router) when the data packet 102 enters the MPLS/IP communication network 100). The FEC to which the data packet is assigned is encoded as FEC indicator (e.g. as a short fixed length value) known as "label" 112 and included into the header of the data packet 102. Thus, when the data packet 106 is forwarded from router 102A to its next hop (which is router 102B), the label 112A is sent along with the data packet 106. At router 102B, there no analysis of the header of the data packet 106 is carried out anymore. Rather, the label 112A alone is directly used as a representation of the FEC which specifies the next hop (i.e. all forwarding is driven by the labels). Further, the label 112A (i.e. the label included in the received data packet 106) is replaced with a new label 112B at router 102B, and the thus modified data packet 106 may then be forwarded to its next hop.

Assume that the data packet 106 has just arrived at router 102B. If, for example, communication link 104B is overloaded, it may be reasonable to route the data packet from router 102B via communication link 104D to router 102E instead to router 102C, for example. From router 102E, the data packet may then be routed via router 102F (via communication links 104E, 104F or via communication links 104E, 104G, 104C) or via router 102C (via communication link 104H, 104C) to router 102D. Rerouting of data packets 106 via alternative communication paths depending on the load of communication links 104 is known as load balancing. Rerouting of data packets 106 may also be necessary due to a failure of a communication link 104. However, in the MPLS/IP communication network 100, no standard functionality may be available in order to apply load balancing.

Figure 2:
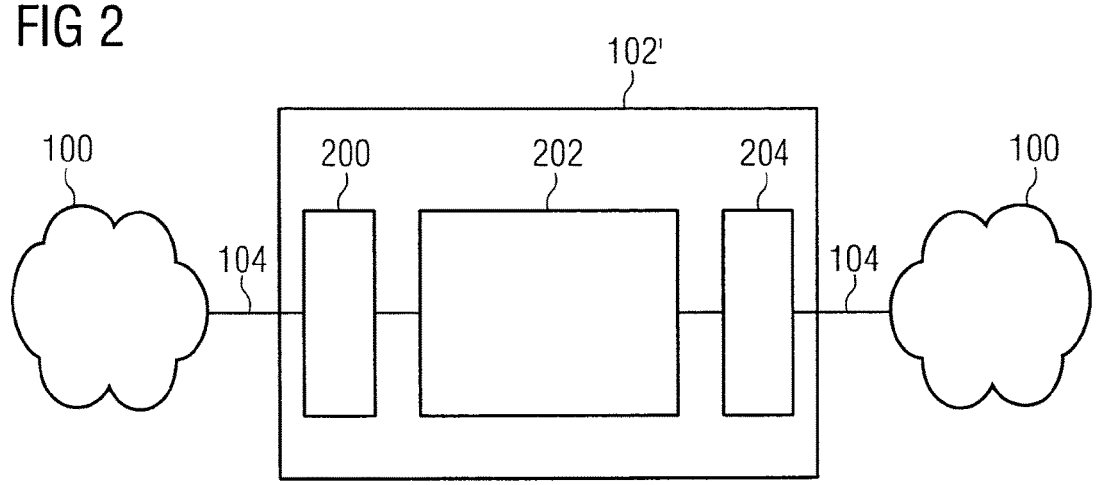
FIG. 2 shows a schematic drawing of a network node according to an embodiment of the present invention.

In order to enable the MPLS/IP communication network 100 to apply load balancing, the routers 102 may be configured as shown in the embodiment of FIG. 2. In FIG. 2, a router 102' is shown which is connectable to a downstream router, and to a non-downstream LFA router of the MPLS/IP communication network 100. The router 102' comprises a receiving unit 200 connected to the MPLS/IP communication network 100 and configured to receive a data packet 106 comprising a load balancing identifier indicating whether it is allowed to load balance the data packet 106 via a non-downstream LFA network node or not. The network node further comprises a processing unit 202 connected to the receiving unit 200 and configured to change, if the load balancing identifier indicates that it is allowed to load balance the data packet 106 via a non-downstream LFA network node, and if the router 102' decides to load balance the data packet 106 via the non-downstream LFA network node, the load balancing identifier of the data packet 106 such that it indicates that a further load balancing of the data packet 106 via a further non-downstream LFA network node is not allowed. Further, the network node comprises a forwarding unit 204 connected to the processing unit 202 and the MPLS/IP communication network 100 and configured to forward the thus modified data packet 106 to the non-downstream LFA network node. The load balancing identifier is part of the label 112 attached to the data packet 106.

Figure 3:
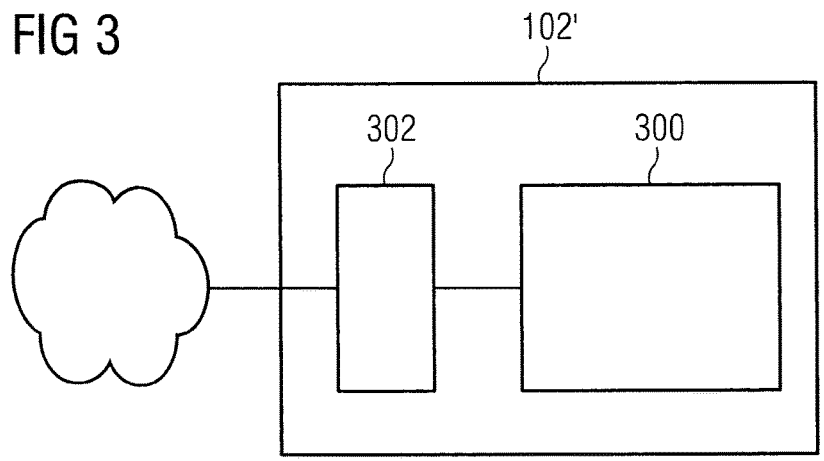
FIG. 3 shows a schematic drawing of a network node according to an embodiment.

Further, in order to enable the conventional MPLS/IP communication network 100 to apply load balancing, the routers 102 may be configured as shown in the embodiment of FIG. 3. In FIG. 3, a router 102' is shown which comprises a generation unit 300 configured to generate, if load balancing of data packets between the router 102' and a destination network node via a non-downstream LFA network node is to be enabled, a first MT IP address comprising a destination IP address of the destination network node, and a load balancing identifier which represents a first FEC of the data packets, and configured to generate a second MT IP comprising a destination IP address of the destination network node, and a load balancing identifier which represents a second FEC of the data packets. The network node further comprises a triggering unit 302 connected to the generation unit 300 and the MPLS/IP communication network 100 and configured to trigger the generation of LDP messages having the first MT IP address as an input parameter, and to trigger the generation of LDP messages having the second MT IP address as an input parameter such that the neighboring network nodes (routers 102') of the router 102' receive the LDP messages.

According to an embodiment, all of the routers 102' of the MPLS/IP communication network 100 (see FIG. 8) comprise the functionality shown in FIG. 3, and at least a part of the routers 102' of the MPLS/IP communication network 100 additionally comprise the functionality shown in FIG. 2.

Figure 4:
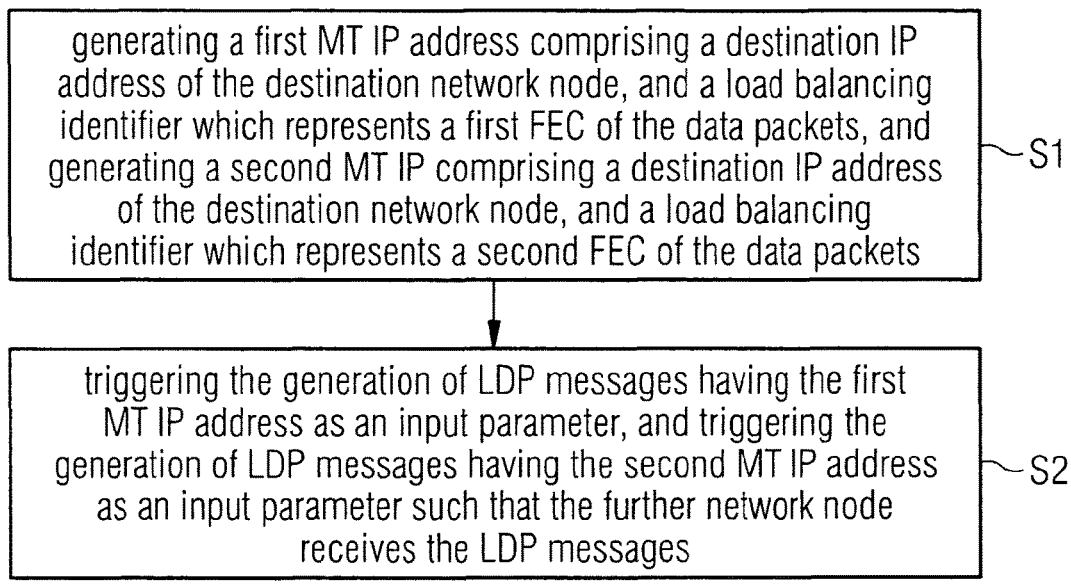
FIG. 4 shows a schematic flowchart of a method of operating a network node according to an embodiment.
Figure 5:
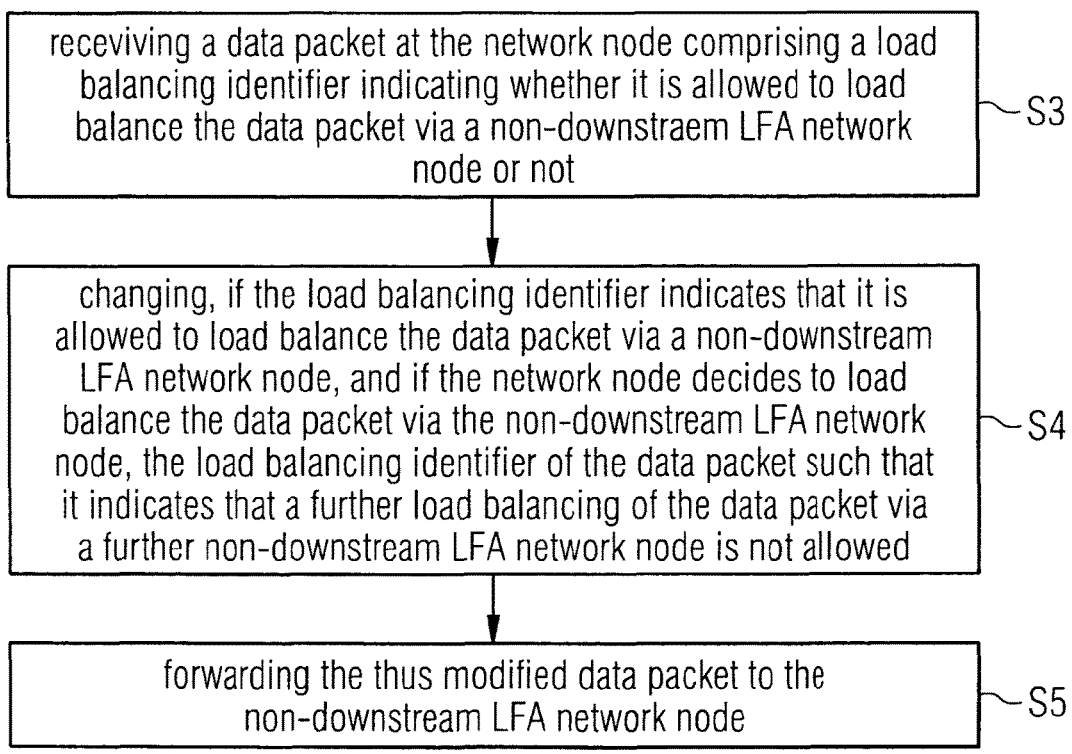
FIG. 5 shows a schematic flowchart of a method of operating a network node according to an embodiment.

Using the functionality of the routers described in FIGS. 2 and 3 in the MPLS/IP communication network 100, a method embodiment as shown in FIGS. 4 and 5 can be performed:

First, the steps as shown in FIG. 4 are carried out. At S1, if load balancing of data packets between a router 102' and a destination network node via a non-downstream LFA network node is to be enabled, a first MT IP address is generated in the router 102' comprising a destination IP address of the destination network node, and a load balancing identifier which represents a first FEC of the data packets. Further, a second MT IP is generated in the router 102' comprising a destination IP address of the destination network node, and a load balancing identifier which represents a second FEC of the data packets.

At S2, the generation of LDP messages having the first MT IP address as an input parameter is triggered by the router 102', and the generation of LDP messages having the second MT IP address as an input parameter is triggered by the router 102'. The router 102' communicates the generated LDP messages to neighboring network nodes (routers 102').

Figure 8:
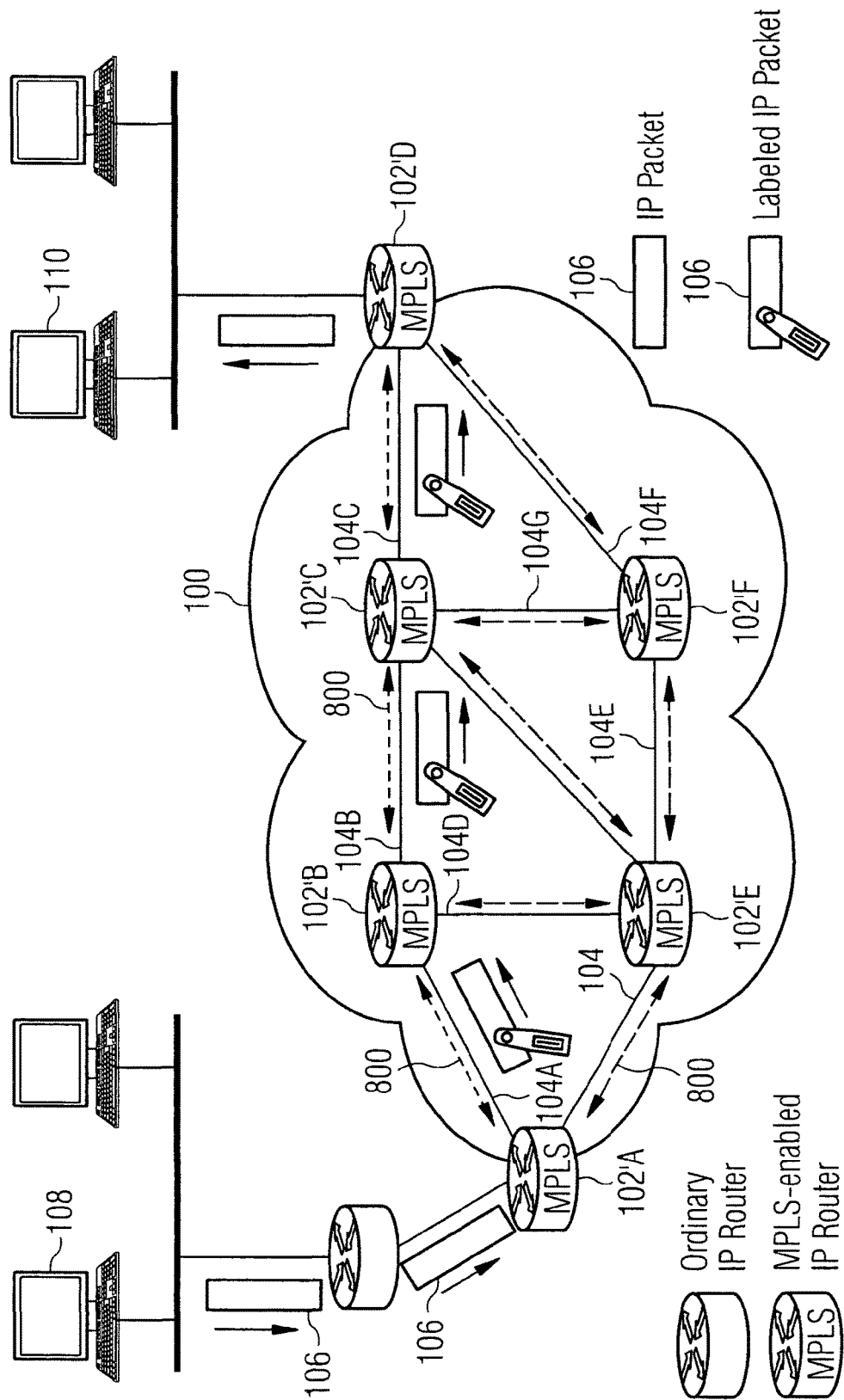
FIG. 8 shows a schematic drawing of a MPLS communication network according to an embodiment.

To give an example: It is assumed in FIG. 8 that the destination network node is router 102'D. This would mean that, for example in router 102'E, the following steps are carried out: At S1, a first MT IP address is generated in the router 102'E comprising a destination IP address of the destination network node 102'D, and a load balancing identifier 1 which represents a first FEC of the data packets. Further, a second MT IP is generated in the router 102'E comprising a destination IP address of the destination network node 102'D, and a load balancing identifier 0 which represents a second FEC of the data packets. At S2, generation of LDP messages having the first MT IP address as an input parameter is triggered by the router 102'E, and the generation of LDP messages having the second MT IP address as an input parameter is triggered by the router 102'E. The router 102'E communicates the generated LDP messages to neighboring network nodes (routers 102'A, 102'B, 102'C, and 102'F). The distribution of the LDP messages to neighboring routers 102' (LDP messaging) is indicated in FIG. 8 by arrows 800. Steps S1 and S2 are preferably done by all routers 102' in order to enable maximum flexibility when carrying out load balancing (see FIG. 5).

Figure 6A:
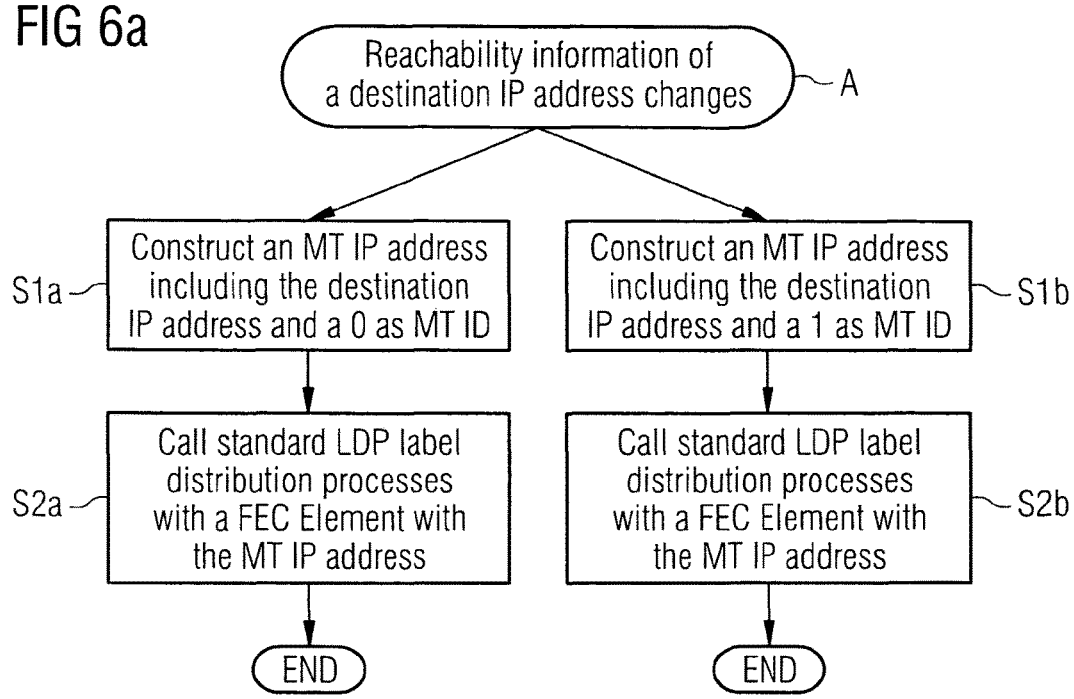
FIG. 6a, b show schematic flowcharts of a method of operating a network node according to an embodiment.

FIG. 6a illustrates a possible embodiment of this example in more detail. It is assumed that, in the first MT IP address, the load balancing identifier is set to "1" (step S1a) in order to enable load balancing via a non-downstream LFA network node, and that, in the second MT IP address, the load balancing identifier is set to "0" (step S1b) in order to disable load balancing via a non-downstream LFA network node (step S1 in FIG. 4). The triggering of generation and distribution of LDP messages (step S2 in FIG. 4) is reflected in FIG. 6a by steps S2a (for the first MT IP address) and S2b (for the second MT IP address). That is, two FEC types are defined using the syntax of MT IP. The FECs that prohibit load balancing via a non-downstream (remote) LFA comprise MT IP addresses with an MT-ID of 0, and the FECs that allow load balancing via a non-downstream (remote) LFA comprise MT IP addresses with an MT-ID of 1. The present invention is not restricted to these values. The MT ID to be used for prohibiting and for explicitly allowing this type of load balancing may be either consistently pre-configured in nodes or may be standardized (IANA). As indicated in FIG. 6a, steps S1a and S1b are in particular carried out when IP reachability information changes (condition "A"), i.e. if an IP address of a router 102 becomes reachable/unreachable. The change of reachability information may for example be detected by a routing protocol used in the communication network.

Figure 6B:
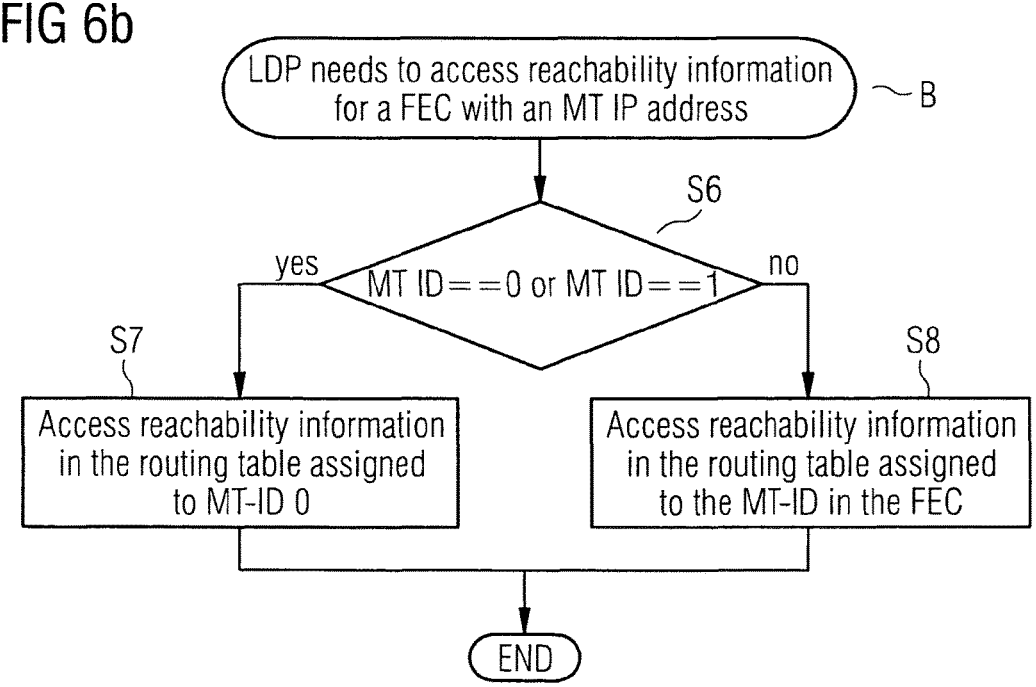

Since standard LDP functionality is only allowed to distribute labels for which the IP address contained in the FEC is reachable, LDP has to check if the IP address for which it distributes the label is reachable in the routing table. This checking process is reflected by FIG. 6b: Condition "B" in FIG. 6b indicates a LDP checking process determining if the IP address for which it distributes the label is reachable in the routing table before communication corresponding LDP messages to neighboring routers. At S6, the LDP checking process determines whether the MT-ID is "0" or "1". If this is the case, then the LDP checking process bases its decision on whether the IP destination address is reachable or not on a common routing table (common for MT-ID "0" and MT-ID "1"), see S7. Thus, single routing table is sufficient, i.e. it is not necessary to set up two (one for each MT-ID used). If the MT-ID is not "0" or "1", the LDP checking process bases its decision on whether the IP destination address is reachable on the routing table assigned to the MT-ID, see S8. That is, the FECs that prohibit and allow load balancing via non-downstream (remote) LFA may share a single routing table (that of MT-ID 0). This does not necessarily mean that a single routing table is required for the two MT-IDs, the point is to require that route queries result in the same answer for both MT-IDs. For instance, this could also be solved by exact replication of the routing tables.

Second, the steps as shown in FIG. 5 are carried out (load balancing). At S3, a data packet is received at the router 102' comprising a load balancing identifier indicating whether it is allowed to load balance the data packet via a non-downstream LFA network node or not. At S4, if the load balancing identifier indicates that it is allowed to load balance the data packet via a non-downstream LFA network node, and if the router 102' decides to load balance the data packet via the non-downstream LFA network node, the load balancing identifier of the data packet is changed such that it indicates that a further load balancing of the data packet via a further non-downstream LFA network node is not allowed. At S5, the thus modified data packet (to be more exactly: the data packet including the thus modified label of the data packet) is forwarded to the non-downstream LFA network node. All or only a part of the routers 102' may be enabled to carry out steps S3 to S5 (load balancing).

To give an example: It is assumed in FIG. 8 that the destination network node is router 102'D, and that router 102'B decides to load balance via router 102'E which is a non-downstream router. This would mean that, if a data packet is received at the router 102'B comprising a load balancing identifier "1" indicating that it is allowed to load balance the data packet via a non-downstream LFA network node the router 102'B initiates load balancing of the data packet via the non-downstream LFA network node 102'E. In order to do so, the load balancing identifier "1" of the data packet is changed such (to "0") that it indicates that a further load balancing of the data packet via a further non-downstream LFA network node is not allowed. At S5, the data packet including a correspondingly modified label is forwarded to the non-downstream LFA network node 102'E. All or only a part of the routers 102' may be enabled to carry out steps S3 to S5 (load balancing).

FIG. 7 shows how a router 102' may be configured in advance in order to be able to carry out steps S3 to S5 shown in FIG. 5 (i.e. FIG. 7 shows how, in order to load balancing for a given destination IP address via a non-downstream LFA, IP/MPLS routers configure their MPLS data path structures). The configuration starts at condition "C" indicating that it is decided to load balance for a destination IP address using the router 102'. At S9, the router 102' determines a set of NHLFEs which are assigned to the destination IP address and the load balancing identifier 1. At S10, a new NHLFE is added to the set of NHLFEs, the new NHLFE comprising the IP address of the non-downstream LFA network node as next hop. Further, at S11, the new NHLFE is configured such that it comprises instructions to swap a label of a data packet such that the load balancing identifier indicates that the data packet belongs to the second FEC. For example, the new NHLFE comprises instructions to change the load balancing identifier from "1" to "0". At S12, the router 102' determines whether the non-downstream LFA network node is a remote network node (i.e. not a direct neighbor of the router 102'). If this is the case, then, at S13, the new NHLFE is additionally configured to comprise instructions to push an additional label to the data packet in case of load balancing, i.e. to attach a further label to the already existing label of the data packet ("outer label") which enables the data packet to "tunnel" through routers located between the router 102' and the remote non-downstream LFA network node in order to prevent that the data packet is sent back from the intermediate routers to the router 102'. The additional label is that received from the IGP next hop of the remote LFA for the MTIP FEC with the IP address of the remote LFA and the MT-ID "0".

In the context of the above example, this would mean in FIG. 8 that router 102'B determines a set of NHLFEs which are assigned to the destination IP address of router 102'D and the load balancing identifier 1. A new NHLFE is added to the set of NHLFEs, the new NHLFE comprising the IP address of the non-downstream LFA network node (router 102'E) as next hop. Further, the new NHLFE is configured such that it comprises instructions to swap a label of a data packet received at router 102'B such that the load balancing identifier indicates that the data packet belongs to the second FEC. For example, the new NHLFE comprises instructions to change the load balancing identifier from "1" to "0". The consequence of the data path configuration shown in FIG. 7 is that, when the router 102'B load balances via a non-downstream LFA network node 102'E, it label switches data packets with incoming labels corresponding MT-ID "1" to outgoing labels that correspond to MT-ID "0".

If on the other hand, the non-downstream LFA network node was router 102'F (remote LFA), and if router decided to load balance via router 102'F, then the new NHLFE is additionally configured to comprise instructions to push an additional label to the data packet in case of load balancing, i.e. to attach a further label to the already existing label of the data packet ("outer label") which enables the data packet to "tunnel" through router 102'E located between the router 102'B and the remote non-downstream LFA network node 102'F in order to prevent that the data packet is sent back from the intermediate router 102'E to the router 102'B. The additional label (outer label) is a label received at the router 102'B from router 102'E (IGP next hop of the remote LFA 102'F) comprising the IP address of the remote LFA network node 102'F as IP destination address and the MT-ID "0".

As has become apparent from the above, standard LDP functionality (which may be used to embody steps S1 in FIG. 4 and step S1a in FIG. 6a) allocates/binds a label to a FEC if the IP address corresponding to the FEC is reachable in a router 102' and distributes the label to the router's immediate IGP neighbors. Neighboring routers may receive labels (via LDP) from several neighbors. The labels received from the neighbors are stored. The router selects one label among these received labels (depending on the routing process for the destination IP address in the FEC) and uses the selected label (corresponding to the selected next hop router) as NHLFE entry.

An extension, compared to the standard FEC may be that the same routing table can used by both of the FEC types defined above.

The proposed load balancing approach may work on a per FEC basis, i.e., one NHLFE entry is selected for a given FEC, or it may work by using an arbitrary hash mechanism, i.e. a hash mechanism selects one of the entries in the set of NHLFEs.

One advantage is that the present approach provides loop free load balancing solution for ring topology IP/MPLS network without relying on traffic engineering extensions. This is sometimes desirable because:

Ring topologies are common in aggregation/metro networks.

Multiple link failures or degradations will simultaneously occur within MW rings or deployments.

Traffic engineering extensions are complex to manage (in comparison to shortest paths).

Adaptive bandwidth handling in microwave networks require a load balancing approach.

Embodiments of the present invention are in particular applicable to IP/MPLS microwave communication networks in aggregation/backhaul network areas.

It is believed that many advantages of the present disclosure will be fully understood from the foregoing description, and it will be apparent that various changes may be made in the form, construction and arrangement of the exemplary aspects thereof without departing from the scope of the invention, or without sacrificing all of its advantages. Because the invention can be varied in many ways, it will be recognized that the invention should be limited only by the scope of the claims that follow.

The invention claimed is:

1. A method of operating a network node of a communication network, the network node being connected to a downstream network node, and to a non-downstream loop free alternate (LFA) network node, the method comprising:
   receiving a data packet at the network node comprising a load balancing identifier indicating whether or not it is allowed to load balance the data packet via the non-downstream LFA network node;
   responsive to the load balancing identifier indicating that the network node is allowed to load balance the data packet via the non-downstream LFA network node, and the network node deciding to load balance the data packet via the non-downstream LFA network node:
      changing the load balancing identifier of the data packet such that it indicates that a further load balancing of the data packet via a further non-downstream LFA network node is not allowed; and
      forwarding the data packet with the changed load balancing identifier to the non-downstream LFA network node;
   wherein the communication network is a multi protocol label switching (MPLS) communication network, and wherein the network node is a label switching router (LSR);
   wherein the data packet comprises a label including the load balancing identifier and a data packet destination IP address, wherein the network node treats the data packet as belonging to a first forwarding equivalence class (FEC) in response to the load balancing identifier indicating that it is allowed to load balance the data packet via the non-downstream LFA network node, and wherein the network node treats the data packet as belonging to a second FEC, in response to the load balancing identifier indicating that it is not allowed to load balance the data packet via the non-downstream LFA network node;
   wherein, before receiving the data packet at the network node, the network node allocates for at least one IP destination address corresponding to a reachable destination network node, a first label and a second label, wherein the first label comprises the IP destination address and a load balancing identifier indicating that it is allowed to load balance the data packet via the non-downstream LFA network node, and wherein the second label comprises the IP destination address and a load balancing identifier indicating that it is not allowed to load balance the data packet via the non-downstream LFA network node, and wherein the network node communicates the first label and the second label to neighboring network nodes;

wherein, when the non-downstream LFA network node is not a direct neighbor of the network node, an additional label, which has been received at the network node from a neighboring network, which is located between the network node and the non-downstream LFA network node, is attached to the data packet, wherein the additional label comprises the data packet destination IP address and a load balancing identifier indicating that it is not allowed to load balance the data packet via the non-downstream LFA network node.

2. The method according to claim 1, further comprising forwarding the data packet to the downstream network node, responsive to the load balancing identifier indicating that the network node is not allowed to load balance the data packet via the non-downstream LFA network node.

3. The method according to claim 2, wherein, even if the load balancing identifier indicates that it is not allowed to load balance the data packet via the non-downstream LFA network node, the network node forwards the data packet to the non-downstream LFA network node in case that a failure has occurred in the communication network which would negatively affect or prohibit the forwarding of the data packet to the downstream network node.

4. The method according to claim 1, wherein said changing of the load balancing identifier and said forwarding of the data packet is carried out using standard functionality for handling data packets belonging to different FECs.

5. The method according to claim 1, wherein the data packet destination IP address and the load balancing identifier together form a multi topology internet protocol (MT IP) address.

6. The method according to claim 1, wherein routing information stored in the network node according to which the network node forwards the data packet is the same for both the first FEC and the second FEC.

7. The method according to claim 1, wherein, before receiving the data packet at the network node, the network node carries out the following processes:
determining a set of next hop label forwarding entries (NHLFEs), which are assigned to the destination IP address and a load balancing identifier indicating that the data packet belongs to the first FEC, based on routing information stored in the network node; and
adding a new NHLFE to the set of NHLFEs, the new NHLFE comprising the IP address of the non-downstream LFA network node as next hop, wherein the new NHLFE comprises instructions to swap a label of the data packet such that the load balancing identifier indicates that the data packet belongs to the second FEC.

8. The method according to claim 1, wherein, in case that a plurality of non-downstream LFA network nodes are available for the network node for load balancing, in order to change the load balancing identifier of the data packet, the network node carries out the following processes before receiving the data packet at the network node:
determining, in response to the load balancing identifier indicating that the data packet belongs to the first FEC, a set of next hop label forwarding entries (NHLFEs), which are assigned to the destination IP address of the MT IP address of the data packet based on routing information stored in the network node; and
adding a plurality of new NHLFEs to the set of NHLFEs, each new NHLFE comprising the IP address of one of the non-downstream LFA network nodes as next hop, wherein the new NHLFE comprises instructions to swap a label of the data packet such that the load balancing identifier indicates that the data packet belongs to the second FEC.

9. A network node of a communication network, the network node being connectable to a downstream network node, and to a non-downstream loop free alternate (LFA) network node of the communication network, comprising:
a receiving unit configured to receive a data packet comprising a load balancing identifier indicating whether or not it is allowed to load balance the data packet via the non-downstream LFA network node;
a processing unit connected to the receiving unit and configured to, in response to the load balancing identifier indicating that it is allowed to load balance the data packet via the non-downstream LFA network node, and the network node deciding to load balance the data packet via the non-downstream LFA network node:
change the load balancing identifier of the data packet such that it indicates that a further load balancing of the data packet via a further non-downstream LFA network node is not allowed; and
forward, via a forwarding unit connected to the processing unit, the data packet with the changed load balancing identifier to the non-downstream LFA network node;
wherein the communication network is a multi protocol label switching (MPLS) communication network, and wherein the network node is a label switching router (LSR);
wherein the data packet comprises a label including the load balancing identifier and a data packet destination IP address, wherein the network node treats the data packet as belonging to a first forwarding equivalence class (FEC) in response to the load balancing identifier indicating that it is allowed to load balance the data packet via the non-downstream LFA network node, and wherein the network node treats the data packet as belonging to a second FEC, in response to the load balancing identifier indicating that it is not allowed to load balance the data packet via the non-downstream LFA network node;
wherein, before receiving the data packet at the network node, the network node allocates for at least one IP destination address corresponding to a reachable destination network node, a first label and a second label, wherein the first label comprises the IP destination address and a load balancing identifier indicating that it is allowed to load balance the data packet via the non-downstream LFA network node, and wherein the second label comprises the IP destination address and a load balancing identifier indicating that it is not allowed to load balance the data packet via the non-downstream LFA network node, and wherein the network node communicates the first label and the second label to neighboring network nodes;
wherein, when the non-downstream LFA network node is not a direct neighbor of the network node, an additional label, which has been received at the network node from a neighboring network, which is located between the network node and the non-downstream LFA network node, is attached to the data packet, wherein the additional label comprises the data packet destination IP address and a load balancing identifier indicating that it is not allowed to load balance the data packet via the non-downstream LFA network node.

10. A non-transitory computer-readable medium storing a computer program that, when executed by processing circuitry of a network node of a communication network that is connected to a downstream network node and to a non-downstream loop free alternate (LFA) network node, configures the network node to:
receive a data packet at the network node comprising a load balancing identifier indicating whether or not it is allowed to load balance the data packet via the non-downstream LFA network node; and
responsive to the load balancing identifier indicating that it is allowed to load balance the data packet via the non-downstream LFA network node, and the network node deciding to load balance the data packet via the non-downstream LFA network node:
change the load balancing identifier of the data packet such that it indicates that a further load balancing of the data packet via a further non-downstream LFA network node is not allowed; and
forward the data packet with the changed load balancing identifier to the non-downstream LFA network node;
wherein the communication network is a multi protocol label switching (MPLS) communication network, and wherein the network node is a label switching router (LSR);
wherein the data packet comprises a label including the load balancing identifier and a data packet destination IP address, wherein the network node treats the data packet as belonging to a first forwarding equivalence class (FEC) in response to the load balancing identifier indicating that it is allowed to load balance the data packet via the non-downstream LFA network node, and wherein the network node treats the data packet as belonging to a second FEC, in response to the load balancing identifier indicating that it is not allowed to load balance the data packet via the non-downstream LFA network node;
wherein, before receiving the data packet at the network node, the network node allocates for at least one IP destination address corresponding to a reachable destination network node, a first label and a second label, wherein the first label comprises the IP destination address and a load balancing identifier indicating that it is allowed to load balance the data packet via the non-downstream LFA network node, and wherein the second label comprises the IP destination address and a load balancing identifier indicating that it is not allowed to load balance the data packet via the non-downstream LFA network node, and wherein the network node communicates the first label and the second label to neighboring network nodes;
wherein, when the non-downstream LFA network node is not a direct neighbor of the network node, an additional label, which has been received at the network node from a neighboring network, which is located between the network node and the non-downstream LFA network node, is attached to the data packet, wherein the additional label comprises the data packet destination IP address and a load balancing identifier indicating that it is not allowed to load balance the data packet via the non-downstream LFA network node.

* * * * *